July 22, 1969     A. GHIONDA     3,456,879

GUIDING RAMP FOR MOTOR VEHICLES

Filed Oct. 28, 1966

INVENTOR
ANDRE GHIONDA

ATTORNEYS

Bilker, Kimmelman & Moyerman

United States Patent Office 3,456,879
Patented July 22, 1969

3,456,879
GUIDING RAMP FOR MOTOR VEHICLES
Andre Ghionda, 7 Quai Jean Baptiste Verany,
Nice, France
Filed Oct. 28, 1966, Ser. No. 594,328
Int. Cl. E04h 6/00
U.S. Cl. 238—4                                    7 Claims

ABSTRACT OF THE DISCLOSURE

To guide a motor vehicle towards an exact spot, such as an elevator bridge in a garage, ramps are used on which the wheels of the vehicle are engaged, these ramps being provided with raised edges to prevent the wheels from running off them.

---

In automatic storied parks, guiding ramps are the more necessary, for transfers of the vehicle between the elevator platform and the various parking boxes, seeing that the vehicle must generally make these movements by gravity, on sloping ramps and in the absence of any driver. Now, in this case, simple ramps, like those now employed in garages, cannot give results, for it often happens that a front wheel of the vehicle, not being directed by the steering wheel, comes into contact with the lateral border of the ramp, owing to a slight deflexion which naturally occurs. Friction then tends to increase this deflexion and the wheel jams, thus causing the vehicle to stop.

With regard to this known arrangement, the present invention consequently has more particularly the purpose of preventing the jamming of the vehicle during its movements on the guiding ramp.

Another object of the invention is to enable the guiding wheels of a motor vehicle to move sideways to the forward direction of this vehicle, when one of these wheels comes into contact with the border of a guiding ramp.

Another object of the invention is to avoid the braking of a directing wheel of a motor vehicle when it rubs against the border of the ramp.

Other objects and advantages of the invention will be revealed by the description and claims hereafter, as well as by the attached drawings, in which:

The support G of the guiding ramp and the support A of the auxiliary ramp are connected and held at a distance corresponding to the track of vehicles, by struts or a common frame B.

The runway $R_g$ of the guiding ramp is divided crosswise into sections S, S', S" . . . each of which rests on two pairs of rollers 1 carried by the support G; the spindles of these rollers being placed parallel to that of the guiding ramp.

Figure 1:
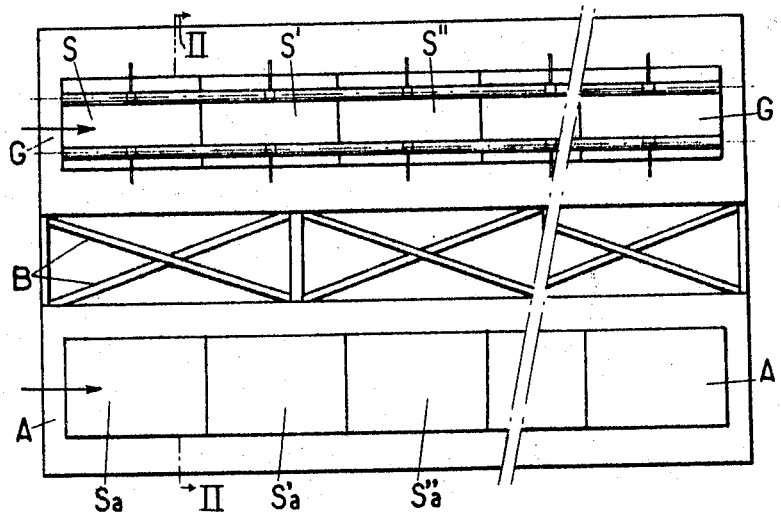
FIGURE 1 is a diagrammatical top view of this ramp.
Figure 2:
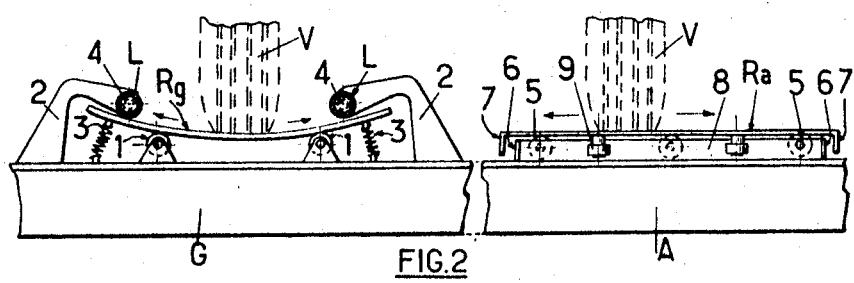
FIGURE 2 is a cross-section on a larger scale along the line II—II of FIGURE 1, of the assembly of two ramps.

The runway $R_g$ is of concave shape upwards and each section can be moved to and fro in a crosswise direction, between two limits formed by lateral elements 2 fixed to the support, while being constantly returned by springs 3 to its mean position. Lateral stops for the wheels V of the vehicle, for preventing the latter from going over the side, each consist of a tube or annular frame-member L, mounted to rotate loosely on a spindle 4 carried by the lateral elements 2 attached to the support G. The frame-members can be in one piece right along the ramp, or in several sections, to leave room for the intermediate supports 2 of their rotation spindle 4. These elements can, as in FIGURE 2, act as lateral abutments for certain sections of the runway $R_g$, other abutments being provided, if necessary.

It will be understood that if the wheel V deflects and hits against a rotary frame-member L, the transversal reaction on the wheel makes the runway oscillate, which thus deviates from the frame-member, and at the same time, the latter revolves on itself, and these two conjugated actions means that the wheel can continue to revolve and go forward, straightening itself; as soon as it has passed the runway section considered, the latter resumes its middle position.

The runway $R_a$ of the auxiliary ramp must simply obey the vehicle, which imparts its own transversal movements to it. Consequently, this runway, divided up into sections $S_a$, $S_a'$, $S_a''$ . . . corresponding to those of the runway of the guiding ramp, is flat and rests on rollers, similar to those of other ramps. The runway can also move sideways between limits determined by the lateral abutments 6 attached to the support A and others attached under the runway, formed for example, by the borders 7, turned towards the bottom of each section.

The runways, or any of their sections, must not be allowed to slide longitudinally. Longitudinal abutments are provided for this purpose, between the support of each runway section.

Figure 3:
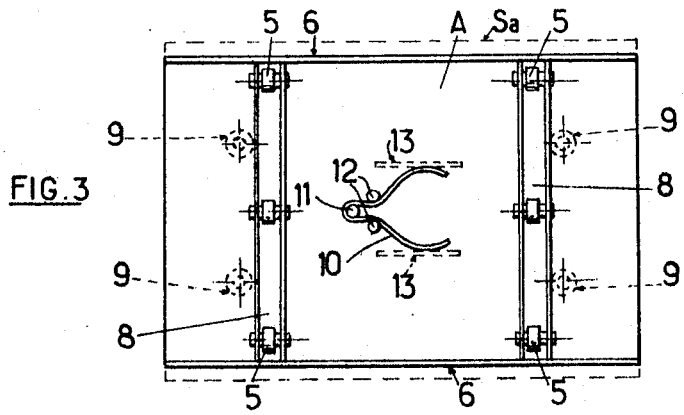
FIGURE 3 is a partial plane view of the auxiliary ramp, the section of the corresponding runway being shown by dotted lines.

As can be seen in FIGURE 3, which shows an underneath view of the runway $R_a$ of the auxiliary ramp, the support can comprise transversal U-shaped irons 8 which, at the same time that they carry the spindles of the rollers 5 between their wings, form abutments, by one of their wings, for the rollers 9, of vertical spindles mounted under the runway. A similar arrangement can be provided on the various sections of the runway of the guiding ramp. FIGURE 3 also shows a device adoptable for forming the recoil spring for sections of the runway of the auxiliary ramp.

This device comprises a two-armed spring 10, which is mounted by its middle bend on a tenon 11 of the support A, and which is held in position by two other tenons 12 of this support. The two free arms of the spring cooperate with two abutments 13, fixed under the corresponding section of the runway.

Of course, the invention is not restricted to the examples of embodiment described above, for which other methods of embodiment can be provided, without going outside of the scope of the invention for that purpose.

What I claim is:
1. A guiding ramp for wheeled vehicles comprising:
   (a) first and second frame members disposed substantially parallel to the axis of said ramp and between which wheels of said vehicles are guided,
   (b) a rigid runway disposed between and below said frame-members, said runway having a concave surface facing upward for receiving said wheels, and
   (c) means for supporting said runway and for enabling transverse movement thereof.
2. The structure according to claim 1 with the addition of:
   (d) a second runway disposed substantially parallel to said first-named runway, and
   (e) an additional means for supporting said second runway and for enabling limited transverse movement thereof.
3. Guiding ramp according to claim 1 comprising spring means connecting the runway to the supporting means, and returning said runway to a mean position.

4. Guiding ramp according to claim 1, in which the frame-members are formed by rotatably mounted cylindrical rods.

5. Guiding ramp according to claim 1, in which the (c) means includes rollers, loosely revolving on spindles and placed parallel to the said axis.

6. Guiding ramp according to claim 1, in which the runway is divided up into several sections independent of each other.

7. Guiding ramp according to claim 6, in which abutments are provided between each runway section and said (c) means to prevent the longitudinal sliding of these sections on the support.

References Cited

UNITED STATES PATENTS 2,010,462   8/1935   Nielsen.

FOREIGN PATENTS 960,347   6/1964   Great Britain.

ROBERT G. SHERIDAN, Primary Examiner

U.S. Cl. X.R.

214—16.1